UNITED STATES PATENT OFFICE.

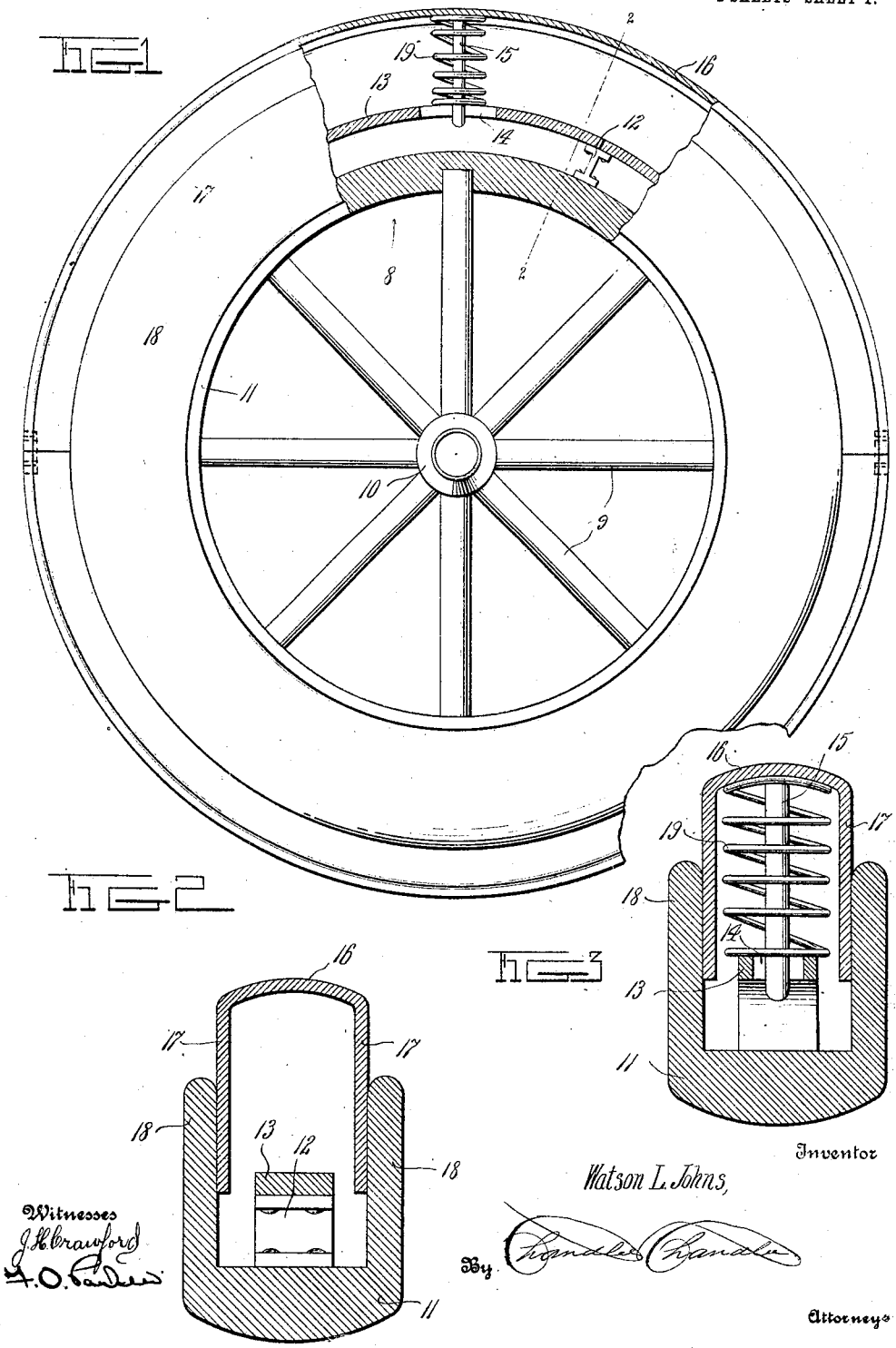

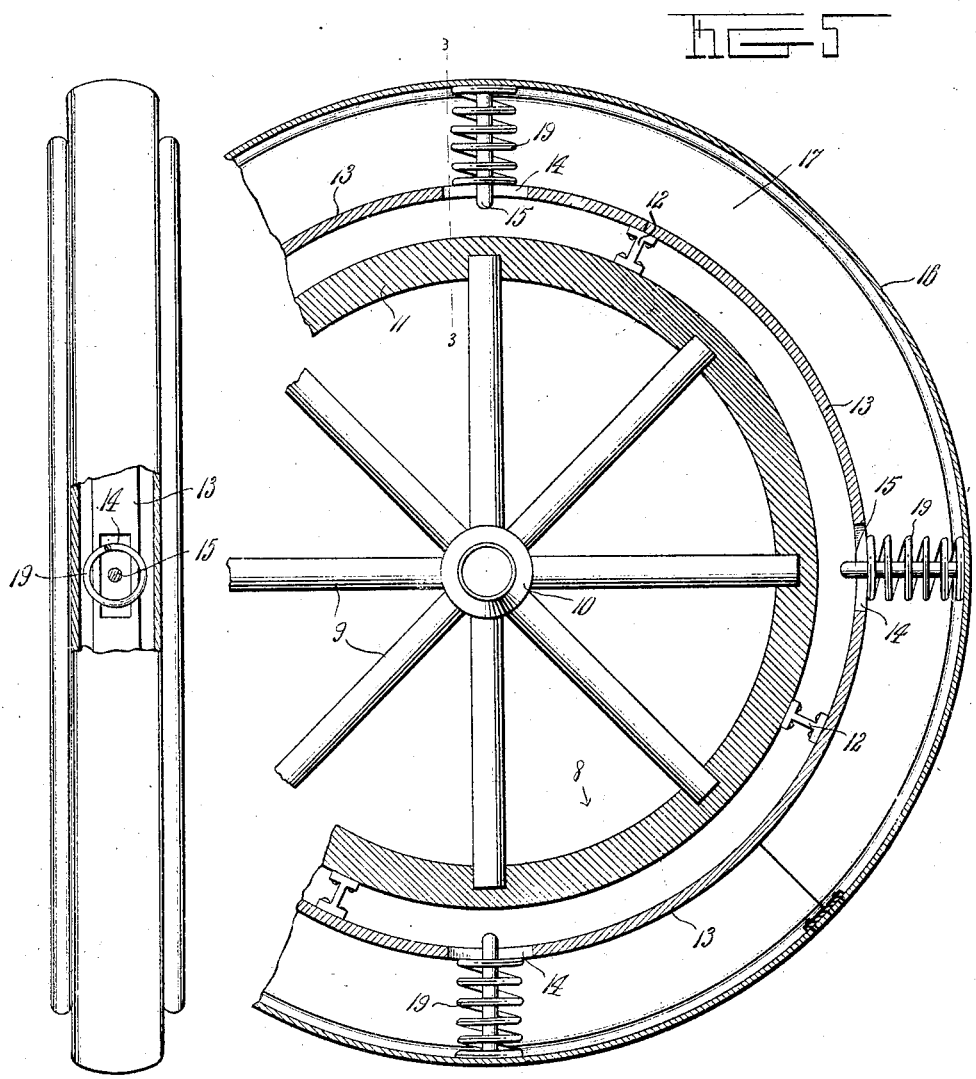

WATSON L. JOHNS, OF SOQUEL, CALIFORNIA.

SPRING-TIRE.

941,926.                    Specification of Letters Patent.    Patented Nov. 30, 1909.

Application filed October 15, 1908.   Serial No. 457,923.

*To all whom it may concern:*

Be it known that I, WATSON L. JOHNS, a citizen of the United States, residing at Soquel, Santa Cruz county, California, have invented certain new and useful Improvements in Spring-Tires; and I do hereby declare the following to be a full, clear, and exact description of the invention, such as will enable others skilled in the art to which it appertains to make and use the same.

The invention relates to a vehicle tire and more particularly to the class of resilient or spring tires.

The primary object of the invention is the provision of a wheel of the resilient type in which a non-puncturable tire is employed in connection with the felly, the tire being held in position on the felly by novel means including resilient elements which support the tire so that the wheel will yield to any irregularity of the ground and take up any sudden shocks.

Another object of the invention is the provision of a spring tire yieldably mounted upon the felly of a wheel and which tire is non-puncturable and formed of metal thus doing away with the use of rubber however, possessing the same or approximately the yielding qualities of a pneumatic tire.

A further object of the invention is the provision of a spring tire of novel construction which is non-puncturable and having yielding or resilient qualities to cushion sudden shocks and which will yield to any irregularity of the ground when in use upon a vehicle wheel.

With these and other objects in view the invention for example consists in the construction, combination and arrangement of parts as will be hereinafter more fully described and as illustrated in the accompanying drawings which disclose the preferred form of the invention while the novelty of the said invention will be included in the appended claims.

In the drawings: Figure 1 is a side view of a vehicle wheel partly in section having a tire embodying the invention attached. Fig. 2 is a section on an enlarged scale, taken on the line 2—2 of Fig. 1. Fig. 3 is a section taken on the line 3—3 of Fig. 5. Fig. 4 is a plan view looking toward the tread of the tire and the same being partly broken away. Fig. 5 is an enlarged fragmentary side elevation of a vehicle wheel and tire the same being in section.

Similar reference characters indicate corresponding parts throughout the several views in the drawings.

In the drawings the numeral 8 designates a vehicle wheel having the usual spokes 9 projecting radially from a hub 10 and supporting a U-shaped felly 11 in cross section the same being preferably formed of wood although it may be of any other suitable material. Secured at intervals within the U-shaped felly 11 circumferentially thereof are a plurality of radially projecting props or supports 12 upon which is mounted an annular rim 13 formed of semi-circular sections the same containing at equi-distant intervals elongated slots or openings 14 to accommodate the inner ends of inwardly projecting pins 15 secured to and protruding centrally from the inner face of an inverted U-shaped annular tire section 16 which is made of two sections the latter having their opposite parallel sides 17 disposed between and working against the inner faces of the parallel sides 18 of the U-shaped felly 11 of the vehicle wheel.

Surrounding the pins 15 are coiled expansion springs 19 one end thereof bearing against the outer face of the annular rim 13 and the opposite end connected to the pin 15 at the point of juncture thereof with the inner face of the inverted U-shaped tire section 15 and each of which springs 19 serve to maintain the said tire section 16 in a position upon the felly 11 so that it will yield or respond by cushioning shocks imparted to the vehicle wheel due to any irregularity of the ground. The springs 19 can be made of such strength and temper as will adapt them to support any load desired and the tire section 16 is preferably formed of metal to adapt the tire for hard surface without the danger of a collapse incident to a pneumatic tire, however, it will have substantially the same amount of elasticity or resilient qualities of the latter owing to the interposition of the springs 19 between the felly 11 and the said tire section and thereby yieldingly support the vehicle wheel and load and adapt itself to any irregularities of a road bed.

It is obvious owing to the interfitting of the tire section 16 in the felly 11 of the vehicle wheel 8 that there is no possibility of the said tire section 16 accidentally running from or leaving the felly of the vehicle wheel when end thrust or lateral shifting of the vehicle wheel occurs. The pins 15 entering and received by the elongated slots or openings 14 in the annular rim 13 prevent the creeping of the tire section 16 on the felly 11 however, the latter is permitted to move longitudinally a slight distance upon the felly of the vehicle wheel so as to permit the tread portion of the tire section to easily take hold of the ground and thereby overcome unnecessary injury to the same.

What is claimed is—

1. In a vehicle tire the combination with a U-shaped wheel rim, of a plurality of props projecting at intervals from the said rim, an annulus supported by said props and containing elongated openings arranged at equi-distant intervals throughout the same, an inverted U-shaped tire section interfitting said wheel rim, pins projecting inwardly from the tire section and engaging the openings, and expansion means interposed between the said annulus and tire section.

2. In a vehicle tire the combination with a U-shaped wheel rim, of a plurality of props projecting at intervals from the said rim, an annulus supported by said props and containing openings arranged at equi-distant intervals throughout the same, an inverted U-shaped tire section interfitting said wheel rim, expansion means interposed between the said annulus and tire section, and means projecting inwardly from the tire section and engaging the openings in the rim.

In testimony whereof, I affix my signature, in presence of two witnesses.

WATSON L. JOHNS.

Witnesses:
ARTHUR W. JOHNS,
ELLEN C. CHILSON.